United States Patent [19]

Pannell et al.

[11] Patent Number: 5,565,092
[45] Date of Patent: Oct. 15, 1996

[54] HALOGEN RESISTANT HYDROGENATION PROCESS AND CATALYST

[75] Inventors: Richard B. Pannell, Kingwood, Tex.; Serge M. J. P. Maroie, Nivelles, Belgium

[73] Assignee: Exxon Chemical Patents Inc., Wilmington, Del.

[21] Appl. No.: 214,336

[22] Filed: Mar. 16, 1994

[51] Int. Cl.$^6$ .................................................. C10G 45/06
[52] U.S. Cl. ................................. 208/262.1; 208/251 H; 208/264; 585/733
[58] Field of Search ................................. 208/44, 262.1, 208/251 H, 142, 264; 585/733, 255; 525/222, 339

[56] References Cited

U.S. PATENT DOCUMENTS

| | | |
|---|---|---|
| 2,025,032 | 12/1935 | Arnold et al. . |
| 2,886,605 | 5/1959 | McClure et al. . |
| 2,911,395 | 11/1959 | Small . |
| 2,963,467 | 12/1960 | Small . |
| 3,356,660 | 12/1967 | Moritz et al. . |
| 3,362,939 | 1/1968 | Moritz et al. . |
| 3,432,518 | 3/1969 | Kallenbach . |
| 3,595,931 | 7/1971 | Hay et al. . |
| 3,855,347 | 12/1974 | Oricchio . |
| 3,912,789 | 10/1975 | Frevel et al. . |
| 3,947,509 | 3/1976 | Isa et al. . |
| 4,042,490 | 8/1977 | Suggitt et al. . |
| 4,113,790 | 9/1978 | Cesca et al. . |
| 4,328,090 | 5/1982 | Stuckey, Jr. et al. . |
| 4,337,329 | 6/1982 | Kubo et al. . |
| 4,376,222 | 3/1983 | Shubkin et al. . |
| 4,384,081 | 5/1983 | Kubo et al. . |
| 4,410,738 | 10/1983 | Cordier ............................ 568/774 |
| 4,511,710 | 4/1985 | Wang et al. . |
| 4,540,480 | 9/1985 | Azuma et al. . |
| 4,547,620 | 10/1985 | Miyata et al. . |
| 4,560,817 | 12/1985 | Bobsein et al. . |
| 4,562,174 | 12/1985 | Stiles . |
| 4,629,766 | 12/1986 | Malatesta et al. . |
| 4,629,767 | 12/1986 | Shyr et al. . |
| 4,652,688 | 3/1987 | Brophy et al. . |
| 4,719,007 | 1/1988 | Johnson et al. . |
| 4,749,817 | 6/1988 | George et al. ..................... 570/204 |
| 4,816,138 | 3/1989 | Visser et al. . |
| 4,818,368 | 4/1989 | Kalnes et al. . |
| 4,851,476 | 7/1989 | Willis . |
| 5,107,051 | 4/1992 | Pannell . |
| 5,155,084 | 10/1992 | Horn et al. . |
| 5,314,614 | 5/1994 | Moser et al. . |

FOREIGN PATENT DOCUMENTS

| | | |
|---|---|---|
| 53-11894 | 2/1978 | Japan . |
| 1043023 | 9/1966 | United Kingdom . |
| 2011911 | 7/1979 | United Kingdom . |

OTHER PUBLICATIONS

Patent Abstracts of Japan, vol. 93, No. 232367 C93–103441, Abstracts of JP, A, 05155918, (Maruzen Petrochem Co. Ltd), 22 Jun. 1993 (Jun. 22, 1993).
"Chemistry of Catalytic Processes", Gatus, Katzer, & Shuit, McGraw–Hill 1979 p. 438–Table 5–17.
"Heterogeneous Hydrogenolysis of Some Flourocarbons" Witt et al., J. Catalysis, vol. 71 p. 270–277 (1981).
"Hydrodechlorination of 1,1 Bis(p–chlorophenyl)–2,2–clichloroethylene in Vapor Phase" Le Pierre et al. J. Catalysis, vol. 52, p. 59–71 (1978).
"Hydrodechlonnation Kinetics & Ryn Mechanisms" Weiss & Krieger, J. Catalysis, vol. 6, pp. 167–185 (1966).
"Chemistry of Nickel–Alumina Catalysts" Bartholomew et al. J. Catalysis, vol. 45, p. 41–53 (1976).
"Catalysis" Beckman, Morrell, Egloff, Reinhold, 1940 p. 400.

Primary Examiner—Asok Pal
Assistant Examiner—Bekir L. Yildirim
Attorney, Agent, or Firm—Catherine L. Bell; Frank E. Reid

[57] ABSTRACT

A process has been developed for decolorizing (and/or hydrogenating, and/or dehalogenating) a halogen containing unsaturated feedstock and/or polymeric resins. The process has the advantage of being substantially less affected by prolonged exposure to halogen contaminants and impurities than typical hydrogenation catalysts. A novel catalyst comprising (a) one or more metals selected from the group consisting of the metals in Group 8, Group 9 Group 10 and mixtures thereof; (b) one or more promoters selected from the group consisting of oxides of the elements in Group 1, Group 2, the Lanthanides group, the Actinides group and mixtures thereof; and (c) a support has also been developed.

16 Claims, No Drawings

HALOGEN RESISTANT HYDROGENATION PROCESS AND CATALYST

FIELD OF THE INVENTION

The present invention relates to a new process and catalyst for hydrogenating (catalytic hydrogenation) hydrocarbon feedstocks containing a halogen. This process can also be used to hydrogenate non-halogen containing feedstocks and resins. The process is preferably used to dehalogenate and saturate feedstocks and polymeric resins such as unsaturated hydrocarbon feedstocks including polymeric resins containing cyclic olefins, diolefins, and aromatics or saturated feedstocks.

BACKGROUND OF THE INVENTION

Processing steps such as polymerization reactions often require the utilization of a halogen containing polymerization catalyst. These catalysts however can leave residual amounts of halogen in the feedstock or polymeric resin which may cause deactivation of the typical hydrogenation catalyst. If subsequent hydrogenation of the feedstock is desired, the small amounts of halogen retained from prior exposure to the halogen containing catalyst presents a processing dilemma. The deactivation or poisoning of Group VIII metal catalysts by even minor halogen levels is well known. See *Catalysis,* Berkman, Morrell and Egloff, Reinhold, 1940, p. 400.

Hydrogenation is often desired for making lighter colored petroleum resins from previously polymerized olefins made by using Friedel-Crafts reagents such as $AlCl_3$ as a catalyst. Hydrogenation after polymerization gives a lighter colored petroleum resin with superior adhesive properties and better age resistance to ultraviolet light.

Hydrogenation catalysts for making lighter colored resins have been previously described in U.S. Pat. Nos. 4,328,090 and 4,629,766. The catalysts are alumina supported sulfided nickel-tungsten or nickel-molybdenum compositions. These catalysts are directed to hydrotreating of resins produced by polymerization of unsaturated cyclic olefin and diolefins.

Other hydrogenation systems for resins containing aromatic rings use hydrogen ($H_2$) gas with a catalyst comprising a combination of noble metals such as Pd, Ru, Rb, Re and Pt on a carrier. See U.S. Pat. No. 4,540,480.

Additional hydrogenation catalysts have been made with a variety of combinations of nickel, molybdenum, cobalt and tungsten on supports such as alumina or silica-alumina. These catalysts are often directed to hydrodesulphurization of petroleum residues. See *Chemistry of Catalytic Processes,* Gates, Katzer and Shuit, McGraw-Hill, 1979, p.438, Table 5–17. The preparation and the chemistry of activation with hydrogen of nickel catalysts supported on alumina has also been described in "Chemistry of Nickel-Alumina Catalysts"; Bartholomew, C. H., Farrauto, R. J., *J. Catalysis,* vol. 45, pp. 41–53 (1976).

A hydrodesulphurization catalyst for petroleum has been prepared from nickel and/or cobalt oxide with molybdenum and/or tungsten oxide with lanthanum and/or cerium oxide on alumina. U.S. Pat. No. 3,975,303. The catalyst was not directed toward a process of hydrogenation or hydrotreating in the presence of halogen. Resin hydrotreating catalysts have been prepared from nickel and/or cobalt oxide with molybdenum and/or tungsten oxide with lanthanum and potassium. U.S. Pat. No. 5,107,051.

There is a need however in the art for a catalyst that can hydrogenate and decolorize a petroleum resin or a feed stream in the presence of a halogen without using expensive elements such as tungsten or molybdenum.

SUMMARY OF THE INVENTION

This invention relates to a process for hydrogenating, decoloring and/or dehalogenating a hydrocarbon feedstock containing up to 1% by weight of a halogen. Preferred catalysts for use in this process are hydrogen activated catalysts comprising one or more Group 8, 9 or 10 metals and a promoter comprising oxides of one or more elements selected from the group consisting of the elements of Group 1, Group 2, the Lanthanides and the Actinides on a support.

DETAILED DESCRIPTION OF THE INVENTION

In a preferred embodiment this invention relates to a process for dehalogenating and/or decoloring and/or hydrogenating a partially or completely unsaturated hydrocarbon feedstock or polymeric resin comprising: contacting a hydrocarbon feed stock or polymeric resin with a supported catalyst composition, essentially free of tungsten and molybbdenum, comprising:

(1) nickel or cobalt or a mixture thereof;

(2) a promoter comprising one or more oxides of one or more elements selected from the group consisting of the elements of Group 1, Group 2, the Lanthanides and the Actinides; and (3) a support.

This invention further relates to new catalyst compositions comprising:

(1) nickel and/or cobalt;

(2) a basic promoter comprising one or more oxides of one or more elements selected from the group consisting of the elements of Group 1, Group 2, the Lanthanides and the Actinides; and (3) a support.

In a preferred embodiment this invention relates to a catalyst composition consisting essentially of:

(1) nickel and/or cobalt;

(2) a basic promoter comprising one or more oxides of one or more elements selected from the group consisting of the elements of Group 1, Group 2, the Lanthanides and the Actinides; and (3) a support.

In a particularly preferred embodiment the catalyst composition is essentially free of tungsten and or molybdenum.

Products of the above processes have improved color, thus these processes can also be used to improve the color of a hydrocarbon stream and/or polymeric resin.

All references to the periodic table are to the new notation as reported in Chemical and Engineering News, 63(5), 27, 1985.) which is herein incorporated by reference.

For convenience, the chemical compositions which contain elements derived from Group 1, Group 2, Lanthanide and Actinide will be referred to as "promoters."

For convenience in stating the chemical compositions of the catalysts, Group 8, 9, and 10 elements will be referred to as metals in the reduced state and Group 1, Group 2, Lanthanides and Actinides as oxides or promoters.

In a preferred embodiment of practicing this invention, the catalyst will comprise a metal compound from Groups 8, 9, or 10 in the reduced state and a promoter from Group 1, Group 2, Lanthanides, or Acitinides and a support. Typically the metal is present at about 10 to about 65% by weight, preferably 35 to about 60% by weight based upon the weight of the metal, the promoter and the support. The promoter is typically present at about 0.2 to 10 weight percent, preferably 0.5 to 3 weight percent based upon the weight of the metal, the promoter and the support.

In a preferred embodiment of practicing this invention the active metal is usually prepared by reducing a compound containing the metal. Preferred compounds that comprise the metal and are easily reduced to provide the active metals are oxides, hydroxides, carbonates, nitrates, and the like of the metal.

Typical reducible metal compounds are metal oxides and include oxides of any metal in Groups 8, 9 and 10, particularly oxides of nickel and/or cobalt. Examples include, but are not limited to, nickel oxide, cobalt oxide, ruthenium oxide, iridium oxide, iron oxide. Hereafter, when the term "metal oxide" is used, it is understood to also encompass any other compounds capable of acting as a vehicle to provide the active metal.

Preferred promoters include oxides of any element in Group 1, Group 2, the Lanthanides group or the Actinides group. Preferred examples of promoters include, but are not limited to oxides of potassium, calcium, cesium, sodium, and the like. Particularly preferred promoters include Oxides of lanthanium, potassium and mixtures thereof. Promoters comprising oxides of lanthanum, potassium, magnesium, rubidium, cesium, neodymium, calcium or mixtures therefor are also preferred.

The metal oxide and the promoters are preferably combined with a support. Acceptable supports include any support known in the art. Preferred supports include silica, alumina, silica-alumina combinations, magnesia, titania, zirconia, activated carbon, Keiselguhr, Fuller's Earth, clays, montmorillonite, calcium aluminate, nickel aluminate, brick dust and the like or mixtures thereof. Especially preferred supports include silica, alumina or mixtures thereof. Preferred supports may be a powder, spheres, or extruded shapes and may have particle sizes of from 0.0001 to 5 mm. A particularly preferred support is alumina. The support may also be prepared as a precipitate from a solution in combination with the metal oxide and basic promoters. The metal oxide and the promoter may be combined prior to loading onto the support or may be loaded separately.

Table I contains a summary of composition of the reduced catalysts on a support. The support could be chosen from alumina, silica, silica-alumina, magnesia, titania, zirconia, activated carbon, Keiselguhr, Fuller's Earth, clays, montmorillonite, calcium aluminate, nickel aluminate, brick dust or other catalyst support materials.

TABLE I

SUPPORTED COMPOSITION

|  | Range (wt % to Total wt.) | Preferred Range (wt % to Total wt.) | Preferred Element(s) |
| --- | --- | --- | --- |
| (1) Metal | 10–65 | 35–60 | Ni, Co, or mixtures thereof |
| (2) Promoter | 0.2–10 | 0.5–3 | La, K |

The catalysts compositions and the activated catalysts may be prepared using techniques known to those of ordinary skill in the art. For example, the catalyst compositions of this invention may be prepared by impregnation or precipitation of the catalyst or catalyst components onto the support. In another embodiment of this invention, the metal may be added to the support by impregnation or precipitation and the promoter may be subsequently impregnated on the support. Precipitation of the support with the combined or individual reducible metal compounds and promoters is also a known technique that could be used to produce the catalysts.

The catalysts are typically activated by reducing the metal oxides in the presence of hydrogen at temperatures between 200° C. and 500° C. to obtain the active metal. Preferably, the catalysts are reduced at temperatures from 250° C. to 400° C.

The supported activated catalyst may then be contacted with a hydrocarbon feedstock or polymeric resin to hydrogenate and/or dehalogenate it. Hydrocarbon feedstocks that may be treated with the catalyst system described above include any hydrocarbon stream including typical streams containing olefins and diolefins including cyclic olefins and aromatics containing olefinic functions. Hydrocarbon resins that may be saturated and/or dehalogenated according to his invention are preferably resins that are prepared by polymerizing a mixture of 4 to 6 carbon olefins and diolefins including cyclic olefins and mixtures of 8–9 carbon aromatics containing an olefinic function such as indene or styrene. Preferred resins may also be made from either the 4–6 carbon materials or the 8–9 carbon materials alone. The hydrocarbons and/or resins to be treated may contain up to 1 weight percent of a halogen. The most common halogen present is chlorine, but fluorine, bromine, and iodine could also be present alone or in combination with another halogen. Non-limiting examples of feedstocks and/or polymeric resins that may be hydrogenated are:

(1) hydrocarbon resins produced by Friedel-Crafts polymerization. (A Friedel-Crafts polymerization product will typically contain between 50 and 1,000 ppm halogen and typically have a Gardner color number in the range of 6 to 10.), (2) feedstocks or resins that contain residual solvents used in the polymerization process, (3) halogen containing olefinic or saturated hydrocarbon mixture, and (4) resins described in U.S. Pat. Nos. 4,328,090 and 4,629,766 which are incorporated by reference herein.

The feedstock and/or polymeric resin can be mixed with a solvent prior to hydrogenation so that it will comprise between 10–90% of the total feed stream. If the feedstock contains a high amount of halogen, it is preferred to dilute the feedstock so that the halogen content does not exceed 1% by weight of the feedstock.

As an additional benefit the life of the hydrogenation catalyst is extended due to the halogen resistance.

Process

The hydrogenation and or dehalogenation process may be run under pressures of atmospheric to about 4,000 psi (about 28 MPa) of hydrogen at varying temperatures, known to those of ordinary skill in the art. (Inert gases may also be used in combination with the up to 4000 psi (28 MPa) of hydrogen.) Typically the temperature is about 150° C. or more, preferably 175° C. to 340° C. Depending on conditions and feedstock, the reaction is carried out in gas phase, liquid phase or mixed phase which are all well known in the art.

Under commercial conditions, the processing temperature ranges are 150° C. to 340° C. with pressure ranges up to about 4,000 psi (28 MPa) of hydrogen. Typically pressure ranges of about 100 psi to about 3000 psi (0.6 MPa to 21

MPa) are used. The reactors for using the catalyst of this invention could be fixed, fluid, or ebulating bed reactors or continuous stirred reactors. The reactors could be isothermal, adiabatic, controlled non-adiabatic or non-isothermal condition by heat transfers since hydrogenation reactions are exothermic.

In a preferred embodiment the catalytic hydrogenation of a halogen containing petroleum resin or a halogen containing feedstock containing up to 1% by weight of a halogen comprises the steps of combining the resin or feedstock with a solvent, preferably at 10 to 90 weight percent, based upon the weight of the resin or feed stock and the solvent; contacting the solvated resin or feedstock with a hydrogen activated supported catalyst, as described above, at a temperature of at least 150° C. and a pressure in the range of about 14 psi to about 4000 psi (about 101 kPa to about 28 MPa) at a residence time of from 10 to 300 minutes.

The instant process is particularly useful in hydrogenating hydrocarbon resins used for adhesive products. These hydrocarbon resins are often products of a Friedel-Crafts polymerization process which typically combines halogenated catalysts, i.e. $AlCl_3$ or $BF_3$ and a water co-catalyst, with the olefins in a solvent that comprises 10–90% of the feed stream at 20° and 200° C. under sufficient pressure as to maintain a liquid phase reaction.

The instant process is also very useful for improving the color of a hydrocarbon.

Although the process and catalyst of this invention are particularly useful for improving the qualities and decolorization of hydrocarbon resins used for adhesives, the process can be used to rid an olefinic or saturated feedstock of catalyst hampering halogens, and improve the color while performing the hydrogenation process. The catalysts produced in accordance with this invention are substantially more resistant to deactivation in the presence of halogen.

Product

The processing catalyst of this invention can improve the Gardner of a resin or a feedstock color to below 3, preferably to between 1 and 2, even more preferably between 1 and 3, which would be a light in color to almost colorless resin. The process also improves the adhesive properties and ultraviolet stability of the final product.

For purposes of this invention the Gardner color number is determined using the procedure set forth in ASTM D-1544-80, which is incorporated by reference herein, except that ASTM D 1544-80 was modified to 50 wt. % resin in toluene. Saybolt color is measured with a Hunterlab calorimeter using a 10 wt. % resin solution, the Saybolt color being calculated with an empirical formula: Saybolt=30−5× Yi. Yi=yellowness index obtained from the Hunterlab calorimeter.

EXAMPLES

Two catalysts, A (without the promoter) and B (with the promoter) shown in Table II were prepared using multiple impregnation technique with the metal salts of the respective oxides as follows: $Ni(NO_3)_2 \cdot 6H_2O$ and $La(NO_3)_3 \cdot 6H_2O$.

TABLE II

| Chemical Compositions of Finished Catalysts Dried | | |
|---|---|---|
| Catalyst | A | B |
| NiO wt % | 56.0 | 56.0 |
| $La_2O_3$ wt % | — | 1.7 |
| $Al_2O_3$ wt % | Balance | Balance |

Catalysts A and B from Table II were prepared and run at elevated pressure. Catalyst A did not have the promoter component and typifies a hydrogenation catalyst. Catalysts B contains the promoter and demonstrated substantially increased tolerance to the halogen containing feedstock. Catalysts A and B were activated by reduction in hydrogen. The catalysts were purged with nitrogen and heated to 120° C. At 120° C., the hydrogen flow was started and the temperature of the catalyst was raised from 150° C. to 425° C. at 2° C./min. The catalyst was held at 425° C. for 2 hr. The catalyst was then cooled to room temperature, purged with nitrogen and placed in an oxygen free atmosphere. After activation, the catalysts were ground to −100 mesh.

The catalysts were used to decolorize a halogen containing hydrocarbon resin prepared from 4–6 carbon olefins and diolefins and 8–10 carbon aromatics polymerized using an $AlCl_3$ catalyst. The hydrocarbon resin contained 400–500 ppm Cl. A 30 wt % solution of the resin in Nappar 10 was used as feedstock. The wt % of catalyst in the stirred reactor was 0.75 wt %. The residence time was 270 minutes, the temperature was 190° C. and the reaction pressure was 75 bar (1088 psi/ 7.5 MPa). After reaction, the catalyst was recovered and tested under the same reaction conditions except the residence time was 120 min.

The following Table III is a comparison of catalysts A and B. The Saybolt color of the products was measured on the reaction product and after the solvent had been removed and the product dissolved in toluene at 10 wt % solution.

TABLE III

| | | Hydrogenated Product | | | |
|---|---|---|---|---|---|
| | | Saybolt Resin Solution** | | Saybolt Resin Solution*** | |
| | Feed Gardner* | fresh catalyst | recycled catalyst | fresh catalyst | recycled catalyst |
| Cat. A | 8 | −14 | −45 | −25 | −47 |
| Cat. B | 8 | −2 | −15 | −3 | −32 |

*Gardner Color (50 wt. % solution in toluene)
**Saybolt Color - Reactor product diluted to 10 wt % in toluene
***Saybolt Color - Steam stripped resin in 10 wt % toluene solution Catalyst B is the chlorine resistant composition of this invention and exhibited chlorine tolerance as indicated by the improved Saybolt color number of the resin as shown in Table III. The product color of the promoted catalyst was lighter for feed processed with both fresh catalyst and recycled catalyst.

The process and catalyst of this invention provide an extended life hydrogenation capability for catalyst treating halogen containing feedstocks. Saturated feedstocks are dehalogenated. Unsaturated olefinic feedstocks are saturated as well as dehalogenated. The process and catalyst of this invention can be used to process a variety of feedstocks with substantially improved halogen resistance.

All references described above, including testing procedures, are incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process for hydrogenating a halogen containing hydrocarbon feedstock or a halogen containing polymeric resin comprising contacting the feedstock or the resin with a catalyst comprising (a) a hydrogenating metal of Ni, Co or a mixture thereof;

(b) one or more promoters selected from the group consisting of oxides of the elements in Group 1, Group 2, the Lanthanides group, the Actinides group and mixtures thereof; and (3) a support, wherein the catalyst is essentially free of tungsten and molybdenum oxides.

2. The process of claim 1 wherein the metal is a mixture of cobalt and nickel.

3. The process of claim 1 wherein the promoter is an oxide of lanthanum, potassium or mixtures thereof.

4. The process of claim 1 wherein the support is alumina.

5. The process of claim 1 wherein said feedstock or resin is present at a temperature of at least 150° C.

6. The process of claim 1 wherein the promoter is present at about 0.2 to about 10% by weight, based upon the weight of the metal, the promoter and the support.

7. The process of claim 1 wherein the promoter is present at about 0.5 to about 3% by weight, based upon the weight of the metal oxide, the promoter and the support.

8. The process of claim 1 wherein the metal is present at about 10 to about 65% by weight, based upon the combined weight of the metal the promoter and the support.

9. The process of claim 1 wherein the metal is present at about 35 to about 60% by weight, based upon the combined weight of the metal, the promoter and the support.

10. A process for catalytic decolorizing a hydrogen containing petroleum resin containing up to 1% by weight of a halogen comprising the steps of combining a feedstock of the resin with a solvent; contacting the solvated feedstock with a hydrogen reduced, activated, alumina, silica or alumina-silica supported catalyst essentially free of tungsten and molybdenum oxides, said catalyst comprising 10–65% by weight of a hydrogenating metal and 0.2–10% by weight of a promoter, said metals being selected from the group consisting of the metals in Group 8, Group 9, Group 10 and mixtures thereof and said promoters being selected from the group consisting of oxides of the elements in Group 1, Group 2, the Lanthanides group, the Actinides group and mixtures thereof and said weight percents being based upon the combined weight of the metal, the promoter and the support.

11. The process of claim 10 wherein the metal is cobalt, nickel or a mixture thereof and the promoter is an oxide of lanthanum and potassium.

12. The process of claim 10 wherein the solvated resin is present at 10% to 90% by weight, based upon the weight of the solvent and the resin.

13. A process to dehalogenate a hydrocarbon stream or a polymeric resin comprising contacting the stream or resin with a catalyst essentially free of tungsten and molybdenum oxides, said catalyst consisting essentially of:

(a) one or more hydrogenating metals selected from the group consisting of metals in Group 8, Group 9, and Group 10 of the periodic table of the elements;

(b) one or more promoters selected from the group consisting of oxides of the elements in Group 1, Group 2, the Lanthanides group, the Actinides group and mixtures thereof, and (3) a support.

14. A process to reduce the Gardner color of a polymeric resin or a hydrocarbon stream to between about 1 and about 3 comprising contacting the resin or stream with a catalyst essentially free of tungsten and molybdenum oxides, said catalyst consisting essentially of:

(a) one or more hydrogenating metals selected from the group consisting of metals in Group 8, Group 9, and Group 10 of the periodic table of the elements;

(b) one or more promoters selected from the group consisting of oxides of the elements in Group 1, Group 2, the Lanthanides group, the Actinides group and mixtures thereof, and (3) a support.

15. A process for decolorizing a halogen containing unsaturated hydrocarbon feedstock or a halogen containing polymeric resin comprising contacting the feedstock or resin with a catalyst essentially free of tungsten and molybdenum oxides, the catalyst comprising (a) a hydrogenating metal of Ni, Co or a mixture thereof;

(b) one or more promoters selected from the group consisting of oxides of the elements in Group 1, Group 2, the Lanthanides group, the Actinides group and mixtures thereof; and (3) a support.

16. A process for dehalogenating a halogen containing unsaturated hydrocarbon feedstock or a halogen containing polymeric resin comprising contacting the feedstock or resin with a catalyst comprising (a) a hydrogenating metal of Ni, Co or a mixture thereof;

(b) one or more promoters selected from the group consisting of oxides of the elements in Group 1, Group 2, the Lanthanides group, the Actinides group and mixtures thereof; and (3) a support, wherein the catalyst is essentially free of tungsten and molybdenum oxides.

* * * * *